(12) United States Patent
Sarmiento Klapper et al.

(10) Patent No.: US 10,983,499 B2
(45) Date of Patent: Apr. 20, 2021

(54) DRILLING FLUID PH MONITORING AND CONTROL (71) Applicants: Helmuth Sarmiento Klapper, Hannover (DE); Brian Ochoa, Hannover (DE)

(72) Inventors: Helmuth Sarmiento Klapper, Hannover (DE); Brian Ochoa, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 499 days.

(21) Appl. No.: 15/134,095

(22) Filed: Apr. 20, 2016

(65) Prior Publication Data

US 2017/0308054 A1 Oct. 26, 2017

(51) Int. Cl.
*G05B 19/406* (2006.01)
*E21B 21/06* (2006.01)

(52) U.S. Cl.
CPC ............ *G05B 19/406* (2013.01); *E21B 21/06* (2013.01); *E21B 21/062* (2013.01); *G05B 2219/32287* (2013.01); *G05B 2219/45129* (2013.01)

(58) Field of Classification Search
CPC ....... C12M 47/04; C12M 33/10; B01L 3/5021
See application file for complete search history.

(56) References Cited

U.S. PATENT DOCUMENTS

| 4,322,300 A | * | 3/1982 | Holmquist | ................ | C09K 8/06 507/117 |
| 4,381,369 A | * | 4/1983 | Holmquist | ................ | C09K 8/24 507/117 |
| 5,937,894 A | | 8/1999 | Rojey | | |
| 2003/0192695 A1 | | 10/2003 | Dillenbeck et al. | | |
| 2007/0178595 A1 | | 8/2007 | Raghuraman et al. | | |

(Continued)

FOREIGN PATENT DOCUMENTS

EP 2677115 A1 12/2013

OTHER PUBLICATIONS

Saasen, et al. "Automatic Measurement of Drilling Fluid and Drill Cuttings Properties," Article, Mar. 2008, 17 Pages, IADC/SPE 112687 Drilling Conference, Orlando, Florida.

(Continued)

*Primary Examiner* — Shogo Sasaki
(74) *Attorney, Agent, or Firm* — Cantor Colburn, LLP (57) ABSTRACT

Examples of techniques for monitoring and controlling the pH of a drilling fluid are disclosed. In one example implementation, a system may include a first sensor to sense a first pH-value and an associated first temperature of the drilling fluid prior to being heated by a drilling fluid heater and a second sensor to sense a second pH-value and an associated second temperature of the drilling fluid subsequent to being heated by the drilling fluid heater. The system may also include a controller comprising a memory having computer readable instructions and a processing device for executing the computer readable instructions. The computer readable instructions include receiving the first pH-value and first temperature from the first sensor, receiving the second pH-value and second temperature from the second sensor, and determining an amount of additive to add to the drilling fluid to maintain a desired pH-value at the second temperature.

8 Claims, 5 Drawing Sheets (56) References Cited

U.S. PATENT DOCUMENTS

| | | |
|---|---|---|
| 2007/0215346 A1 | 9/2007 | Sloan et al. |
| 2010/0038318 A1 | 2/2010 | Gilmour et al. |
| 2010/0250142 A1* | 9/2010 | Zamora .................. E21B 49/08 702/12 |
| 2011/0042078 A1* | 2/2011 | Chapman ............... C09K 8/032 166/252.5 |
| 2015/0224550 A1 | 8/2015 | Frazier |
| 2015/0310367 A1* | 10/2015 | Kuesters .......... G06Q 10/06312 705/7.22 |
| 2015/0322772 A1* | 11/2015 | Pelletier .................. E21B 47/01 250/254 |
| 2016/0046852 A1* | 2/2016 | May ........................ C09K 8/12 175/72 |
| 2016/0230533 A1* | 8/2016 | Steele ..................... E21B 33/16 |
| 2016/0237810 A1* | 8/2016 | Beaman, Jr. ............ E21B 47/10 |

OTHER PUBLICATIONS

International Search Report and Written Opinion dated Jun. 15, 2017 cited in Application No. PCT/US2017/026126, 11 pgs.
European Search Report Issued in Application No. 17786327.1/ PCT/US2017/026126 dated Nov. 14, 2019; 8 Pages.

* cited by examiner

DRILLING FLUID PH MONITORING AND CONTROL

BACKGROUND

The present disclosure relates to pH monitoring and, more particularly, to monitoring and controlling pH in drilling fluid.

Boreholes are drilled into earth formations for the exploration and production of hydrocarbons, subterranean fluids, and minerals. During drilling operations components in the drillstring are in contact with the drilling fluid. Drilling fluids can be water or oil based but sometimes gaseous drilling fluids are also used. Drilling fluid properties are tailored to optimize drilling operations. The pH-value of drilling fluids, for instance, is typically controlled to maintain certain levels of corrosion protection to the metallic materials in the drillstring.

Demanding service conditions characterized by high temperature and corrosive environments (e.g., environments containing high chloride concentrations and/or corrosive gasses (e.g., $CO_2$, $H_2S$, etc.)) can significantly reduce the reliability and service life of downhole equipment. Improper pH levels downhole contribute to corrosion such as pitting corrosion, environmentally assisted cracking (EAC), co-leaching, elastomers damage and secondary corrosion. It should be appreciated that pH-excursions from a desired pH range of 8 to 12 can be the leading cause of downhole equipment failures or the cause of significant damage to drilling equipment. This leads to costly non-productive time (NPT) and high repair costs.

BRIEF SUMMARY

According to examples of the present disclose, techniques including methods, systems, and/or computer program products for monitoring and controlling the pH-value of a drilling fluid are provided. An example system may include a first sensor to sense a first pH-value and an associated first temperature of the drilling fluid prior to being heated by a drilling fluid heater and a second sensor to sense a second pH-value and an associated second temperature of the drilling fluid subsequent to being heated by the drilling fluid heater. The system may also include a controller comprising a memory having computer readable instructions and a processing device for executing the computer readable instructions. The computer readable instructions include receiving the first pH-value and first temperature from the first sensor, receiving the second pH-value and second temperature from the second sensor, and determining an amount of additive to add to the drilling fluid to maintain a desired pH-value at the second temperature.

According to additional examples of the present disclosure, an example method may include monitoring, by a first sensor, a first pH-value of the drilling fluid prior to the drilling fluid being heated. The method may further include monitoring, by a second sensor, a second pH-value of the drilling fluid subsequent to the drilling fluid being heated. The method may also include determining, by a processing system, an amount of additive being added to the drilling fluid to alter the pH-value of the drilling fluid.

According to additional examples of the present disclosure, an example system may include a sensor to sense a pH-value and an associated temperature of the drilling fluid after the drilling fluid is pumped out of a wellbore and heated by a drilling fluid heater to a temperature representative of the expected temperature downhole of the wellbore.

The system may further include a controller comprising a memory having computer readable instructions and a processing device for executing the computer readable instructions. The computer readable instructions include applying an empirical correlation to determine an amount of additive to be added to the drilling fluid to alter the pH-value of the drilling fluid based on an effect of the temperature on the pH-value of the drilling fluid determined by sensing the pH-value of the drilling fluid at the temperature representative of the expected temperature downhole of the wellbore.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of techniques for monitoring and controlling the pH of a drilling fluid. One example system includes a first sensor to sense a first pH-value and an associated first temperature of the drilling fluid prior to being heated by a drilling fluid heater and a second sensor to sense a second pH-value and an associated second temperature of the drilling fluid subsequent to being heated by the drilling fluid heater. The system also includes a controller comprising a memory having computer readable instructions and a processing device for executing the computer readable instructions. The computer readable instructions include receiving the first pH-value and first temperature from the first sensor, receiving the second pH-value and second temperature from the second sensor, and determining an amount of additive to add to the drilling fluid to maintain a desired pH-value at the second temperature. This and other examples are described in more detail herein.

During normal operation of a well, the pH-value of the drilling fluid is typically measured in a batch-by-batch process by technical staff at the well site at room temperature. Based on the measured results, and if necessary, additives (e.g., lime, NaOH, etc.) are added to the drilling fluid to change the pH-value of the drilling fluid to keep the drilling fluid pH in an acceptable range, such as between 8 and 12. Consequently, pH control depends upon how often the pH-value of the drilling fluid are measured and controlled. Existing techniques also rely on two flawed assumptions: 1) that the pH of the drilling fluid does not change with temperature and pressure; and 2) that there is no time delay between assessing the pH-value, adding additives to adjust the pH, and rechecking the pH-value of the drilling fluid.

However, in reality, the pH-value of the drilling fluid at the service conditions (i.e., downhole) might differ significantly from the pH-value of the drilling fluid at room temperature and at atmospheric pressure. Moreover, pH-drift with temperature depends on the type of the drilling fluid, which may be important in high-temperature high-pressure wells. The present techniques also may only check pH-values a few times a day, causing time delays between measuring and controlling/altering the pH.

Although a range of pH 8 to pH 12 is considered acceptable, other values and/or ranges may also be acceptable in various applications, and the particular range(s) disclosed herein are not necessarily limiting on the present disclosure.

The present techniques evaluate the influence of temperature and pressure on pH of the drilling fluid when taking pH measurements and when determining whether to add additive and how much additive to add. Moreover, the present techniques enable real time or near real time adjustments of the pH-value in the drilling fluid by continuously monitoring the drilling fluid. The present techniques improve the reliability of downhole equipment, reduce downhole equipment repair cost related to corrosion damage due to pH-excursions, and extend the life of downhole equipment. These and other advantages will be apparent from the description that follows.

The teachings of the present disclosure can be applied in a variety of well operations. These operations may involve using one or more treatment agents to treat the drilling fluid, the formation fluid, the production fluid, a stimulation fluid, the wellbore, and/or equipment in the wellbore, such as production tubing. The treatment agents may be in the form of liquids, gasses, solids, semi-solids, and mixtures thereof. Illustrative treatment agents include, but are not limited to, fracturing and stimulation fluids, acids, steam, water, brine, corrosion inhibitors, $H_2S$-scavengers, oxygen scavengers, scale inhibitors, cement, permeability modifiers, drilling fluids, emulsifiers, demulsifiers, tracers, flow improvers etc. Illustrative well operations include, but are not limited to, hydraulic fracturing, stimulation, tracer injection, cleaning, acidizing, steam injection, water-flooding, cementing, etc.

In additional aspects of the present disclosure, the techniques described herein can be applied to monitor and control a variety of drilling fluid properties in addition to or different than the pH-value. These properties include, for example, pressure, density, electrical conductivity, thermal conductivity, viscosity, redox-potential, etc., as well as combinations thereof.

Figure 1:
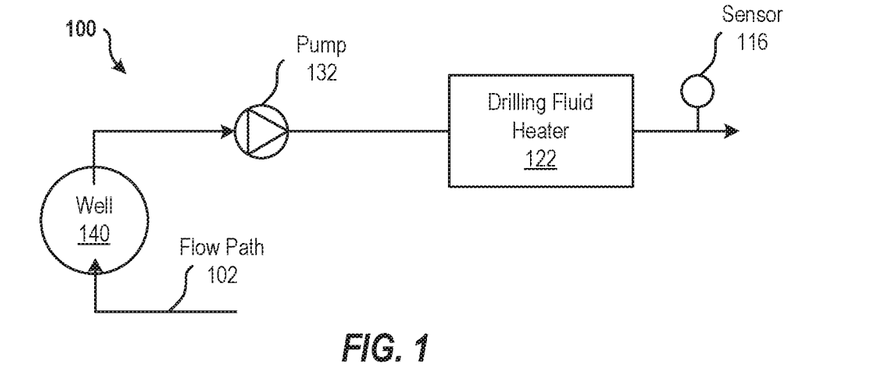
FIG. 1 illustrates a block diagram of an environment for monitoring pH in a drilling operation according to aspects of the present disclosure.

FIG. 1 illustrates a block diagram of an environment 100 for monitoring pH in a drilling operation according to aspects of the present disclosure. The environment 100 includes sensor 116, a drilling fluid heater 122, a pump 132, and a well 140 in fluid communication along a flow path 102 of a drilling fluid.

The example of FIG. 1 illustrates the scenario of monitoring pH of the drilling fluid as it travels along the flow path 102 out of the well 140. The environment 100 utilizes sensor 116, which senses the pH-value of the drilling fluid when the drilling fluid exits the drilling fluid heater 122. In examples, sensor 116 also senses temperature of the drilling fluid. The temperature sensed at sensor 116 may be approximate to or representative of an expected temperature downhole in the well 140. In examples, the drilling fluid heater 122 is adjusted, such as by a processing system or controller, to heat the drilling fluid to a particular temperature, for example, the expected temperature downhole. This temperature approximation enables adding an additive to adjust the pH-value of the drilling fluid as discussed herein.

Figure 2:
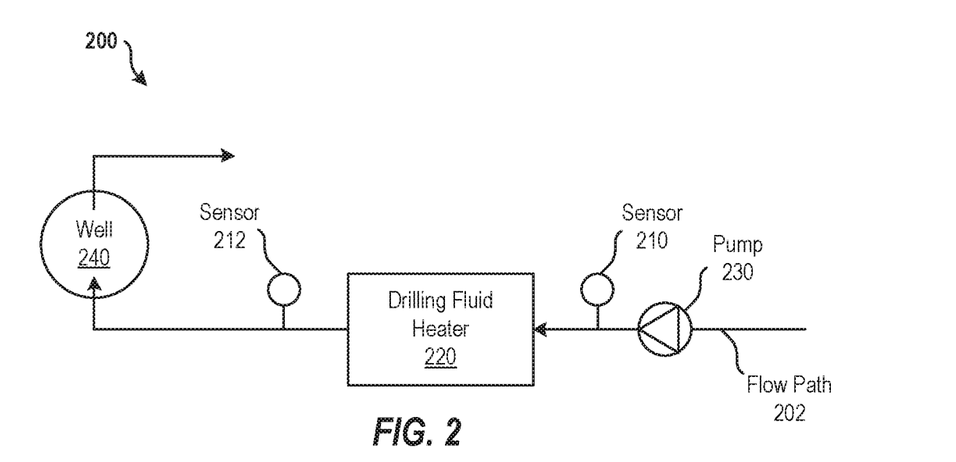
FIG. 2 illustrates a block diagram of an alternate environment for monitoring pH in a drilling operation according to aspects of the present disclosure.

FIG. 2 illustrates a block diagram of an environment 200 for monitoring pH in a drilling operation according to aspects of the present disclosure. The environment 200 includes sensors 210, 212, a drilling fluid heater 220, a pump 230, and a well 240 in fluid communication along a flow path 202 of a drilling fluid.

The example of FIG. 2 illustrates the scenario of monitoring pH of the drilling fluid as it travels along the flow path 202 into the well 240. The environment 200 utilizes sensors 210, 212, which sense pH-values of drilling fluid as the drilling fluid travels along the flow path 202. The pump 230 pumps the drilling fluid along the flow path 202. In examples, sensors 210, 212 also sense temperature of the drilling fluid. The sensor 210 senses a first pH-value and an associated first temperature of the drilling fluid prior to the drilling fluid entering and being heated by the drilling fluid heater 220. The first temperature sensed at sensor 210 may be lower than an expected temperature downhole in the well 240.

The drilling fluid heater 220 then heats the drilling fluid, for example, to a temperature that corresponds to the expected temperature downhole in the well 240. In examples, the drilling fluid heater 220 is adjusted, such as by a processing system or controller, to heat the drilling fluid to the expected temperature downhole based on the first temperature. That is, the first temperature is used to adjust the drilling fluid heater 220 to heat the drilling fluid to reach the expected temperature downhole.

The sensor 212 then senses a second pH-value and an associated second temperature of the drilling fluid subsequent to the drilling fluid being heated by the drilling fluid heater 220. The second pH-value approximates the pH-value downhole in the well 240 because the temperature of the drilling fluid after being heated by the drilling fluid heater 220 is representative of the expected temperature downhole of the well 240. This temperature approximation enables adding an additive to adjust the pH-value of the drilling fluid as discussed herein.

Figure 3:
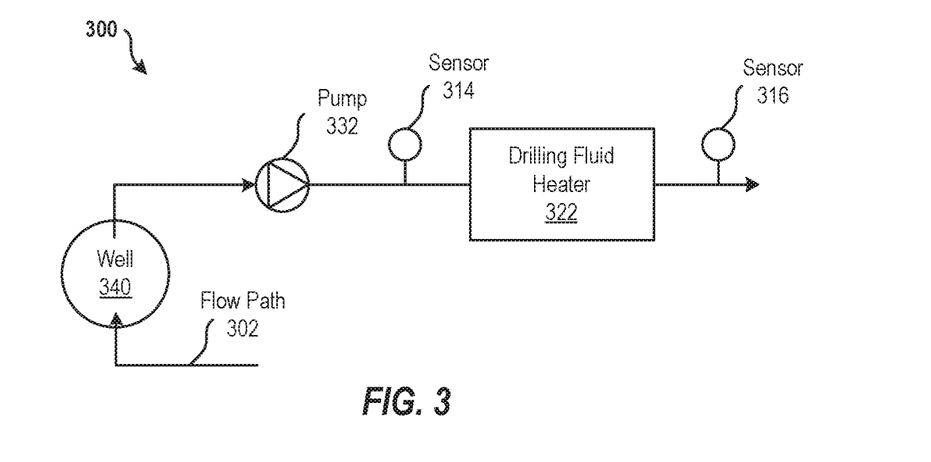
FIG. 3 illustrates a block diagram of an alternate environment for monitoring pH in a drilling operation according to aspects of the present disclosure.

FIG. 3 illustrates a block diagram of an alternate environment 300 for monitoring pH in a drilling operation according to aspects of the present disclosure. The environment 300 includes sensors 314, 316, a drilling fluid heater 322, a pump 332, and a well 340 in fluid communication along a flow path 302 of a drilling fluid.

The example of FIG. 3 illustrates the scenario of monitoring pH of the drilling fluid as it travels along the flow path 302 out of the well 340. The pump 332 pumps the drilling fluid out of the well 340 and along flow path 302. The environment 300 utilizes sensors 314, 316, which sense pH-values of the drilling fluid as the drilling fluid travels along the flow path 302. In examples, sensor 314, 316 also sense temperature of the drilling fluid. The sensor 314 senses a first pH-value and an associated first temperature of the drilling fluid prior to the drilling fluid entering and being heated by the drilling fluid heater 322. The first temperature sensed at sensor 314 may be lower than an expected temperature downhole in the well 340.

The drilling fluid heater 322 then heats the drilling fluid, for example, to a temperature that corresponds to the expected temperature downhole in the well 340. In examples, the drilling fluid heater 322 is adjusted, such as by a processing system or controller, to heat the drilling fluid to the expected temperature downhole based on the first temperature. That is, the first temperature is used to adjust the drilling fluid heater 322 to heat the drilling fluid to reach the expected temperature downhole.

The sensor 316 then senses a second pH-value and an associated second temperature of the drilling fluid subsequent to the drilling fluid being heated by the drilling fluid heater 322. The second pH-value approximates the pH-value of the drilling fluid downhole in the well 340 because the temperature of the drilling fluid after being heated by the drilling fluid heater 322 is representative of the expected temperature downhole of the well 340. This temperature approximation enables adding an additive to adjust the pH-value of the drilling fluid as discussed herein.

Figure 4:
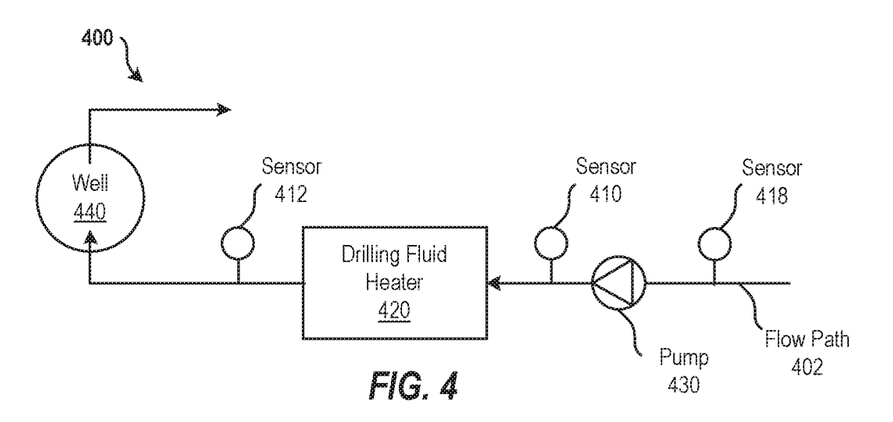
FIG. 4 illustrates a block diagram of an alternate environment for monitoring and controlling pH in a drilling operation according to aspects of the present disclosure.

FIG. 4 illustrates a block diagram of an alternate environment 400 for monitoring pH in a drilling operation according to aspects of the present disclosure. The environment 400 includes sensors 410, 412, 418, drilling fluid heater 420, pump 430, and well 440 in fluid communication along a flow path 402 of a drilling fluid.

The example of FIG. 4 illustrates the scenario of monitoring pH of the drilling fluid as it travels along the flow path 402 into the well 440 similar to the environment 200 of FIG. 2. The sensors 418 and 410 before and after the pump 430, respectively, sense various properties (e.g., pressure, pH-level, temperature, viscosity, density, etc.) of the drilling fluid before and after pressurization by the pump 430. It should be appreciated that each sensor 410, 412, 418 may represent a plurality of sensors or a sensor array for sensing the various properties of the drilling fluid.

In this example, the sensor 418 senses, for example, the pH-value, the temperature, and the pressure of the drilling fluid before it is pressurized by the pump 430. The sensor 410 then senses, for example, the pH-value, the temperature, and the pressure of the drilling fluid before it is heated by the drilling fluid heater 420 but after it is pressurized by the pump 430. After the drilling fluid is heated, the sensor 412 senses, for example, the pH-value, the temperature, and the pressure of the drilling fluid after it is heated by the drilling fluid heater 420 and pressurized by the pump 430 but prior to being pumped into the well 440. This enables the pH-value to be compared before and after pressurization, since the pH-value may vary with temperature and pressure.

Figure 5:
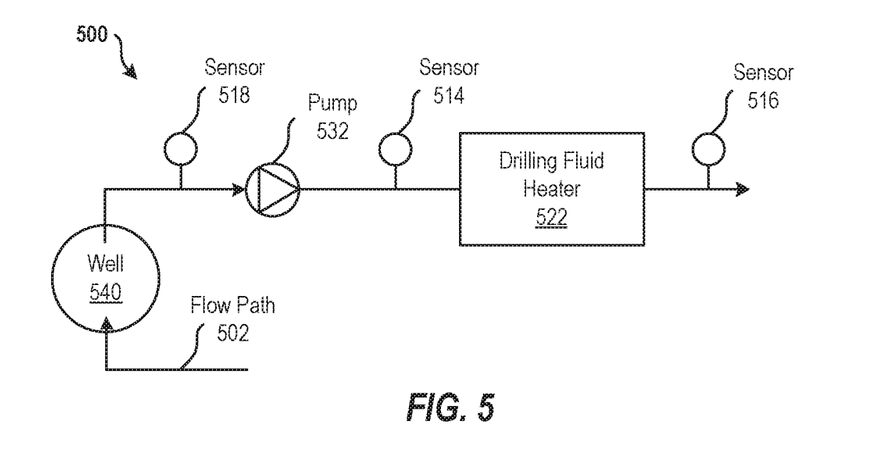
FIG. 5 illustrates a block diagram of an alternate environment for monitoring and controlling pH in a drilling operation according to aspects of the present disclosure.

FIG. 5 illustrates a block diagram of an alternate environment 500 for monitoring pH in a drilling operation according to aspects of the present disclosure. The environment 500 includes sensors 514, 516, 518, drilling fluid heater 522, pump 532, and well 540 in fluid communication along a flow path 502 of a drilling fluid.

The example of FIG. 5 illustrates the scenario of monitoring pH of the drilling fluid as it travels along the flow path 502 out of the well 540 similar to the environment 300 of FIG. 3. The sensors 518 and 514 before and after the pump 532, respectively, sense various properties (e.g., pressure, pH-value, viscosity, density, etc.) of the drilling fluid before and after pressurization by the pump 532. It should be appreciated that each sensor 514, 516, 518 may represent a plurality of sensors or a sensor array for sensing the various properties of the drilling fluid.

In this example, the sensor 518 senses, for example, the pH-value, the temperature, and the pressure of the drilling fluid after it leaves the well 540 but before it is pressurized by the pump 532. After the drilling fluid is pressurized by the pump 532, the sensor 514 senses, for example, the pH-value, the temperature, and the pressure of the drilling fluid. The drilling fluid heater 522 then heats the drilling fluid, and the sensor 516 senses, for example, the pH-value, the temperature, and the pressure of the drilling fluid. This enables the pH-value to be compared before and after pressurization and before and after being heated, since the pH-level may vary with temperature and pressure.

Figure 6:
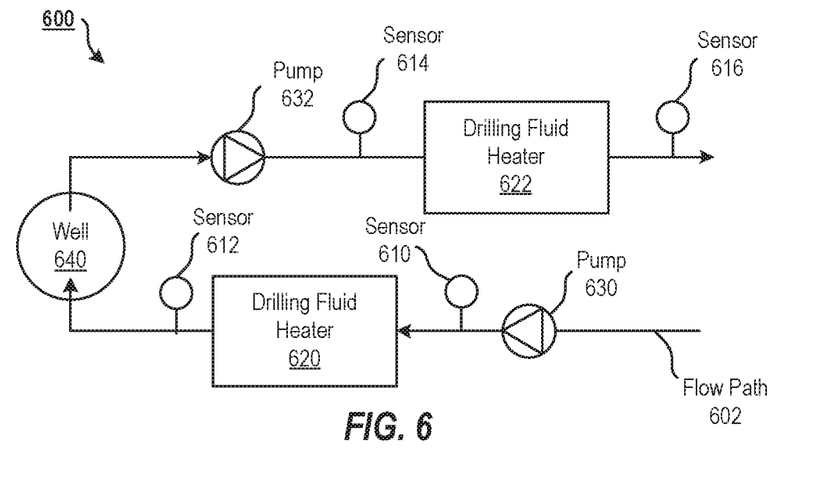
FIG. 6 illustrates a block diagram of an alternate environment for monitoring and controlling pH in a drilling operation according to aspects of the present disclosure.

FIG. 6 illustrates a block diagram of an alternate environment 600 for monitoring pH in a drilling operation according to aspects of the present disclosure. The environment 600 includes sensors 610, 612, 614, 616, drilling fluid heaters 620, 622, pumps 630, 632, and well 640 in fluid communication along a flow path 602 of a drilling fluid.

The example of FIG. 6 illustrates the scenario of monitoring pH of the drilling fluid as it travels along the flow path 602 into the well 640 and out of the well 640. The pump 630 pumps the drilling fluid along the flow path 602 into the well 640. The environment 600 utilizes sensors 610, 612, which sense pH-values of drilling fluid as the drilling fluid travels along the flow path 602. In examples, sensors 610, 612 also sense temperature of the drilling fluid. The sensor 610 senses a first pH-value and an associated first temperature of the drilling fluid prior to the drilling fluid entering and being heated by the drilling fluid heater 620. The first temperature sensed at sensor 610 may be lower than an expected temperature downhole in the well 640.

The drilling fluid heater 620 then heats the drilling fluid, for example, to a temperature that corresponds to the expected temperature downhole in the well 640. The drilling fluid heater 620 may be adjusted, such as by a processing system or controller, to heat the drilling fluid to the expected temperature downhole.

The sensor 612 then senses a second pH-value and an associated second temperature of the drilling fluid subsequent to the drilling fluid being heated by the drilling fluid heater 620. The second pH-value approximates the pH-value downhole in the well 640 because the temperature of the drilling fluid after being heated by the drilling fluid heater 620 is representative of the expected temperature downhole of the well 640. This temperature approximation enables adding an additive to adjust the pH-value of the drilling fluid as discussed herein. The pump 620 then pumps the heated drilling fluid into the well.

The pump 632 pumps then the drilling fluid out of the well 640 and along flow path 602. The environment 600 utilizes sensors 614, 616, which sense pH-values of the drilling fluid as the drilling fluid travels along the flow path 602 out of the well 640. In examples, sensor 614, 616 also sense temperature of the drilling fluid. The sensor 614 senses a third pH-value and an associated third temperature of the drilling fluid prior to the drilling fluid entering and being heated by the drilling fluid heater 622. The first temperature sensed at sensor 614 may be lower than the expected temperature downhole in the well 640.

The drilling fluid heater 622 then heats the drilling fluid, for example, to a temperature that corresponds to the expected temperature downhole in the well 640. The drilling fluid heater 622 may be adjusted, such as by a processing system or controller, to heat the drilling fluid to the expected temperature downhole based on the third temperature. That is, the third temperature is used to adjust the drilling fluid heater 622 to heat the drilling fluid to reach the expected temperature downhole.

The sensor 616 then senses a fourth pH-value and an associated fourth temperature of the drilling fluid subsequent to the drilling fluid being heated by the drilling fluid heater 622. The fourth pH-value approximates the pH-value downhole in the well 640 because the temperature of the drilling fluid after being heated by the drilling fluid heater 622 is representative of the expected temperature downhole of the well 640. This temperature approximation enables adding an additive to adjust the pH-value of the drilling fluid as discussed herein.

Figure 7:
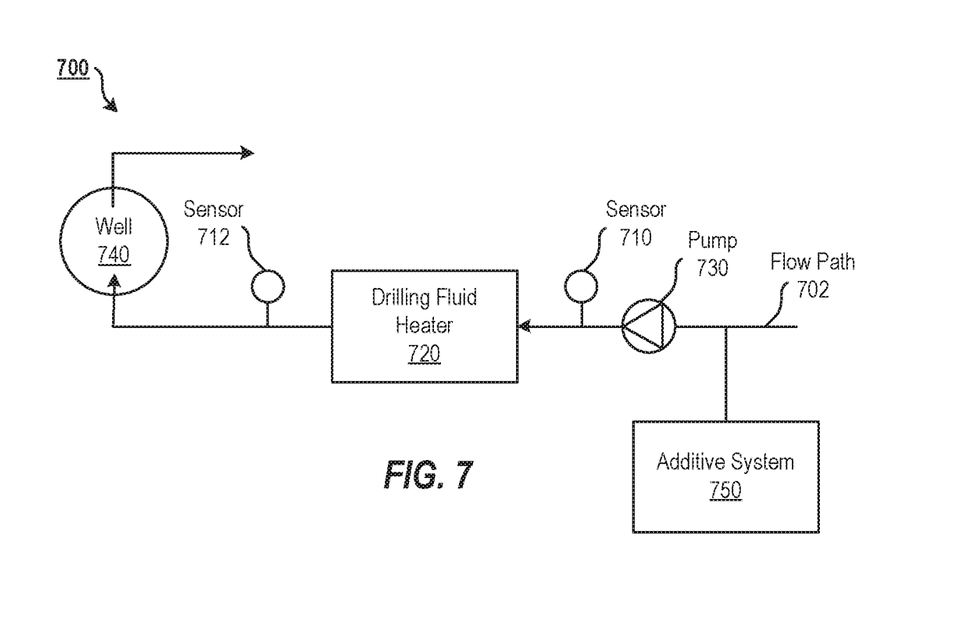
FIG. 7 illustrates a block diagram of an alternate environment for monitoring and controlling pH in a drilling operation according to aspects of the present disclosure.

FIG. 7 illustrates a block diagram of an alternate environment 700 for monitoring and controlling pH in a drilling operation according to aspects of the present disclosure. The environment 700 includes sensors 710, 712, a drilling fluid heater 720, a pump 730, a well 740, and an additive system 750 in fluid communication along a flow path 702 of a drilling fluid.

As in the example of FIG. 2, the example of FIG. 7 illustrates the scenario of monitoring pH of the drilling fluid as it travels along the flow path 702 into the well 740. The environment 700 utilizes sensors 710, 712, which sense pH-values and associated temperatures of drilling fluid as the drilling fluid travels along the flow path 702 before and after the drilling fluid heater 720 heats the drilling fluid, for example, to a temperature close to the downhole temperature of the well 740.

Based on the sensed pH-values, additive system 750 may add an additive to the drilling fluid to maintain a desired pH-value in the drilling fluid that ingress the well 740. For example, a second pH-value sensed by the sensor 712 may indicate that the pH-value at the expected temperature downhole in the well 740 is low (i.e., too acidic) or too high (i.e., too basic). If the pH-value at the expected temperature downhole is lower compared to a predefined minimum value (e.g., a pH-value of 8), additive may be added to the drilling fluid to raise the pH. Conversely, if the pH-value at the expected temperature downhole is higher compared to a predefined maximum value (e.g., a pH-value of 12), additive may be added to the drilling fluid to lower the pH. In examples, the additive system 750 may operate to keep the pH-value of the drilling fluid within a desired range, such as between 8 and 12, although other pH-values may be desired in other examples.

The additive system 750 and the sensors 710, 712 may be communicatively coupled to a processing system (e.g., processing system 800 of FIG. 8 and/or processing system 20 of FIG. 9) to monitor the pH-values sensed at the sensors 710, 712 and to automatically add additive to the drilling fluid.

In aspects of the present disclosure, the processing system may apply a correlation model generated, for example, at a laboratory, that describes the relation between pH and temperature for a given drilling fluid. For example, the processing system may apply an empirical correlation to determine an amount of additive to be added to the drilling fluid to alter the pH-value of the drilling fluid based on an effect of the temperature on the pH-value of the drilling fluid determined by sensing the pH-value of the drilling fluid at the temperature representative of the expected temperature downhole of the wellbore.

In some examples of the environments 100, 200, 300, 400, 500, 600, 700 it should be appreciated that additional components may be included. For example, with reference to FIG. 7, the well 740 may include a third pH sensor (not shown) to sense the pH-value of the drilling fluid downhole. This reduces the uncertainty of the pH measurement of the drilling fluid in contact with downhole equipment and increases the response time to correct an undesirable pH-value to a desirable level. In some examples, the response time may be halved.

Although the additive system 750 of FIG. 7 is illustrated as being in fluid communication with the flow path 702 of the drilling fluid, in other examples, the additive may be added directly downhole in the well 740. Additionally, the pH-value data collected using the present techniques may be stored in a data store and used in combination with prediction models to assess the remaining service life of the downhole equipment to improve reliability and reduce the risk of downhole equipment failure.

Figure 8:
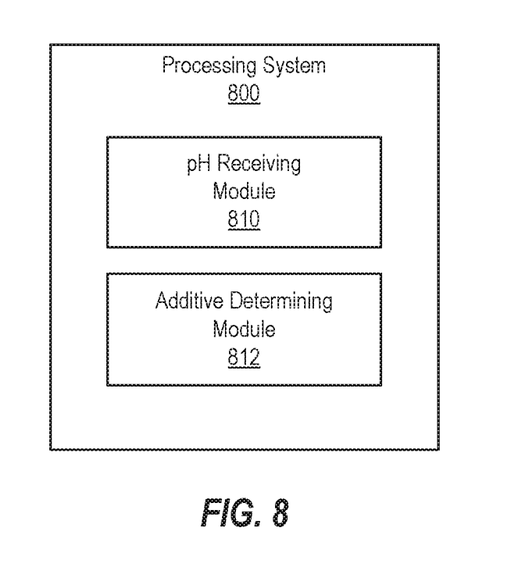
FIG. 8 illustrates a block diagram of a processing system for monitoring and controlling pH in a drilling operation according to aspects of the present disclosure.

FIG. 8 illustrates a block diagram of a processing system 800 for monitoring and controlling pH in a drilling operation according to aspects of the present disclosure. The various components, modules, engines, etc. described regarding FIG. 8 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus, a system memory can store program instructions that when executed by processing device implement the engines described herein. Other engines may also be utilized to include other features and functionality described in other examples herein.

Processing system 800 may include a pH receiving module 810 and an additive determining module 812. The pH receiving module 810 receives a first pH and a first associated temperature from a first sensor (e.g., sensor 210 of FIG. 2). The first sensor senses the first pH-value and the associated first temperature of the drilling fluid before the drilling fluid being heated in a drilling fluid heater (e.g., drilling fluid heater 220 of FIG. 2). The pH receiving module 810 also receives a second pH-value and a second associated temperature from a second sensor (e.g., sensor 212 of FIG. 2). The second sensor senses the second pH-value and the associated second temperature of the drilling fluid subsequent to the drilling fluid being heated by the drilling fluid heater.

The additive determining module 812 determines an amount of additive to add to the drilling fluid to maintain a desired pH at the second temperature using the second pH-value. The second temperature is representative of an expected temperature downhole of a well (e.g., well 240 of FIG. 2). An additive may be added to the drilling fluid to adjust the pH-value of drilling fluid to a desired range.

Alternatively or additionally, the processing system 800 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 9:
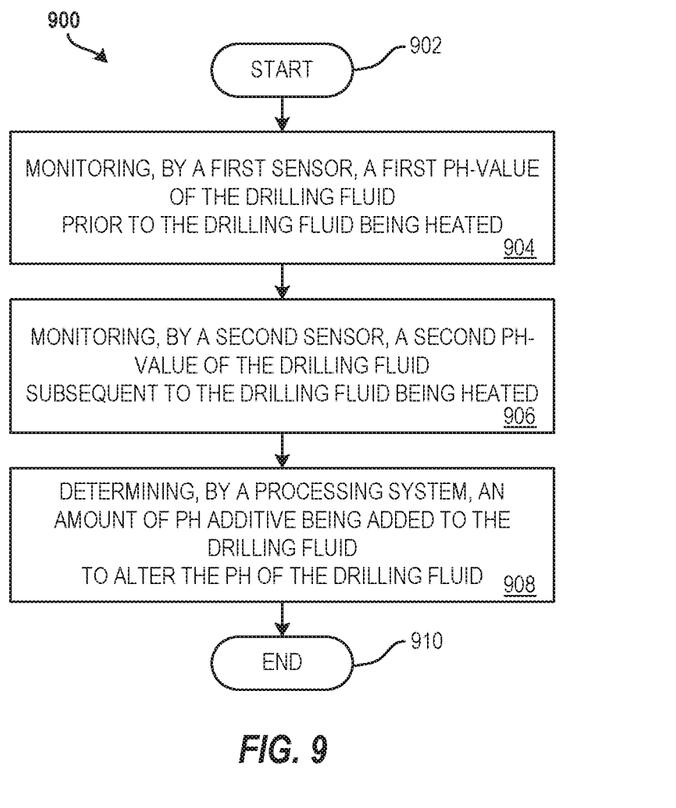
FIG. 9 illustrated a flow diagram of a method for monitoring and controlling pH in a drilling operation according to aspects of the present disclosure.

FIG. 9 illustrated a flow diagram of a method 900 for monitoring and controlling pH in a drilling operation according to aspects of the present disclosure. The method 900 starts at block 902 and continues to block 904.

At block 904, the method 900 includes monitoring, by a first sensor, a first pH-value of the drilling fluid prior to the drilling fluid being heated. At block 906, the method 900 includes monitoring, by a second sensor, a second pH-value of the drilling fluid subsequent to the drilling fluid being heated. At block 908, the method 900 includes determining, by a processing system, an amount of additive being added to the drilling fluid to alter the pH of the drilling fluid. The method 900 continues to block 910 and ends.

In examples, monitoring the first pH and monitoring the second pH occurs prior to the drilling fluid being injected into a well. In other examples, monitoring the first pH-value and monitoring the second pH-value occurs subsequent to the drilling fluid being injected into a well. The drilling fluid is heated, for example, to a temperature representative of a downhole temperature of a well.

In aspects of the present disclosure, first sensor includes a first pH sensor and a first temperature sensor, and the second sensor includes a second pH sensor and a second temperature sensor. In such cases, monitoring the first pH includes monitoring an associated first temperature, and monitoring the second pH-value includes monitoring an associated second temperature.

Additional processes also may be included. For example, the method 900 may include adding, by an additive system, the determined amount of additive to the drilling fluid. The method 900 may also include monitoring, by a third sensor, a third pH-value of the drilling fluid, wherein the third sensor is downhole in a well. It should be understood that the processes depicted in FIG. 9 represent illustrations, and that other processes may be added or existing processes may be removed, modified, or rearranged without departing from the scope and spirit of the present disclosure.

Figure 10:
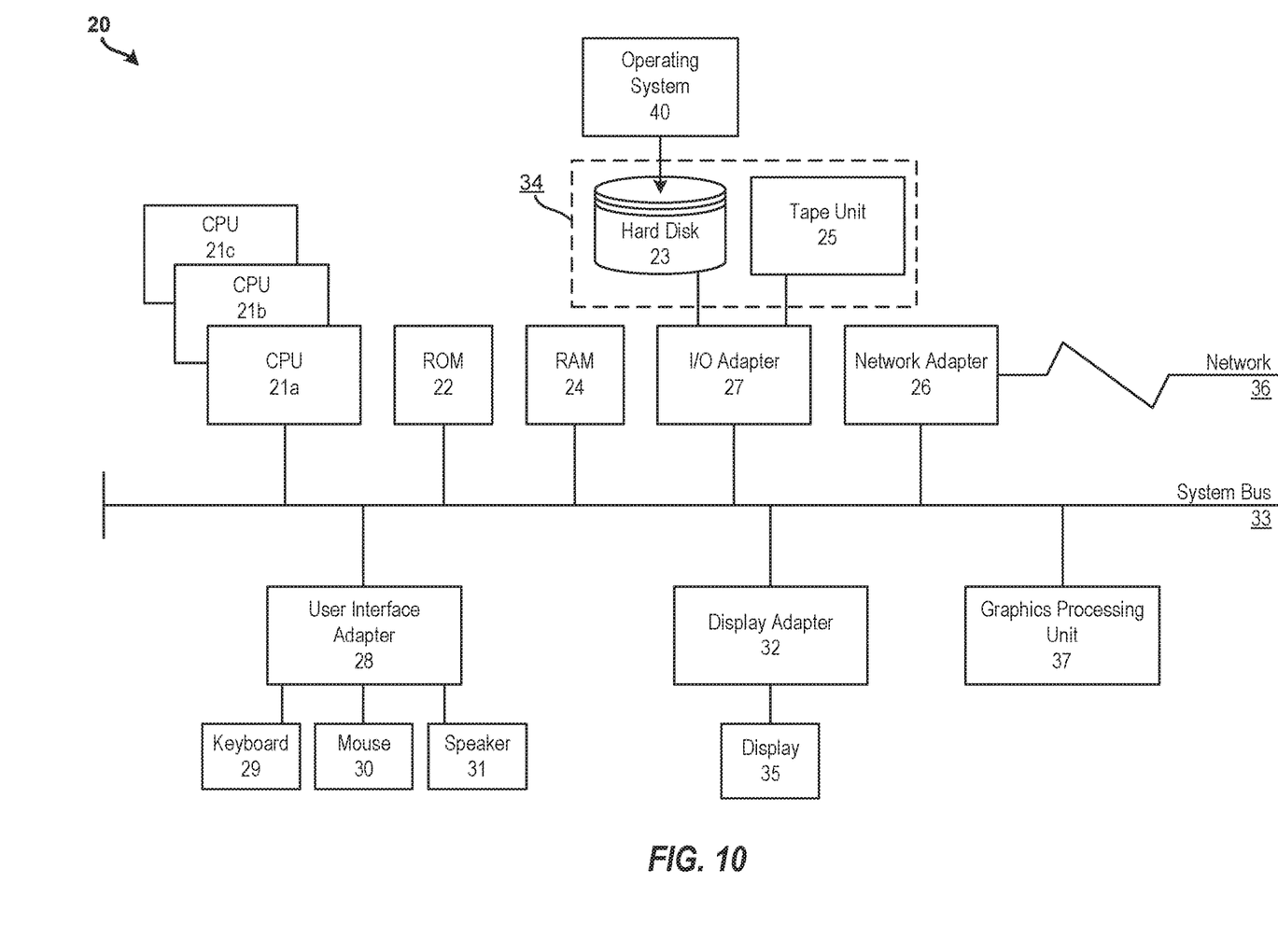
FIG. 10 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 10 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Set forth below are some embodiments of the foregoing disclosure:

Embodiment 1

A system for monitoring and controlling the pH of a drilling fluid, the system comprising: a first sensor to sense a first pH-value and an associated first temperature of the drilling fluid prior to being heated by a drilling fluid heater; a second sensor to sense a second pH-value and an associated second temperature of the drilling fluid subsequent to being heated by the drilling fluid heater; and a controller comprising a memory having computer readable instructions and a processing device for executing the computer readable instructions, the computer readable instructions comprising: receiving the first pH-value and first temperature from the first sensor; receiving the second pH-value and second temperature from the second sensor; and determining an amount of additive to add to the drilling fluid to maintain a desired pH-value at the second temperature.

Embodiment 2

The system of claim 1, wherein the second temperature is representative of an expected temperature downhole of a well.

Embodiment 3

The system of claim 2, further comprising: the drilling fluid heater to heat the drilling fluid.

Embodiment 4

The system of claim 3, the computer readable instructions further comprising: adjusting the drilling fluid heater based on the first temperature to heat the drilling fluid to the downhole temperature.

Embodiment 5

The system of claim 1, wherein the first sensor comprises a first pH sensor and a first temperature sensor, and wherein the second sensor comprises a second pH sensor and a second temperature sensor.

Embodiment 6

The system of claim 1, the computer readable instructions further comprising: enabling the determined amount of additive to be added to the drilling fluid by an additive system.

Embodiment 7

The system of claim 1, wherein the drilling fluid heater is a first drilling fluid heater, the system further comprising: a third sensor to sense a third pH-value and an associated third temperature of the drilling fluid prior to being heated by a second drilling fluid heater; a fourth sensor to sense a fourth pH-value and an associated fourth temperature of the drilling fluid prior to being heated by the second drilling fluid heater.

Embodiment 8

The system of claim 1, further comprising: adjusting the second drilling fluid heater based on the third temperature to heat the drilling fluid to the downhole temperature.

Embodiment 9

A method for monitoring and controlling the pH of a drilling fluid, the method comprising: monitoring, by a first sensor, a first pH-value of the drilling fluid prior to the drilling fluid being heated; monitoring, by a second sensor, a second pH-value of the drilling fluid subsequent to the drilling fluid being heated; and determining, by a processing system, an amount of additive being added to the drilling fluid to alter the pH of the drilling fluid.

Embodiment 10

The method of embodiment 9, wherein monitoring the first pH-value and monitoring the second pH-value occurs prior to the drilling fluid being injected into a well.

Embodiment 11

The method of embodiment 9, wherein monitoring the first pH-value and monitoring the second pH-value occurs subsequent to the drilling fluid being injected into a well.

Embodiment 12

The method of embodiment 9, wherein the drilling fluid is heated to a temperature representative of a downhole temperature of a well.

Embodiment 13

The method of embodiment 9, wherein the first sensor comprises a first pH sensor and a first temperature sensor, wherein the second sensor comprises a second pH sensor and a second temperature sensor, wherein monitoring the first pH-value includes monitoring an associated first temperature, and wherein monitoring the second pH-value includes monitoring an associated second temperature.

Embodiment 14

The method of embodiment 9, the computer readable instructions further comprising: adding, by an additive system, the determined amount of additive to the drilling fluid.

Embodiment 15

The method of embodiment 9, monitoring, by a third sensor, a third pH-value of the drilling fluid, wherein the third sensor is downhole in a well.

Embodiment 16

A system for monitoring and controlling the pH of a drilling fluid, the system comprising: a sensor to sense a pH-value and an associated temperature of the drilling fluid after the drilling fluid is pumped out of a wellbore and heated by a drilling fluid heater to a temperature representative of the expected temperature downhole of the wellbore; and a controller comprising a memory having computer readable instructions and a processing device for executing the computer readable instructions, the computer readable instructions comprising: applying an empirical correlation to determine an amount of additive to be added to the drilling fluid to alter the pH-value of the drilling fluid based on an effect of the temperature on the pH-value of the drilling fluid determined by sensing the pH-value of the drilling fluid at the temperature representative of the expected temperature downhole of the wellbore.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

Additionally, the term "about" is intended to include the degree of error associated with measurement of the particular quantity based upon the equipment available at the time of filing the application. For example, "about" can include a range of ±8% or 5%, or 2% of a given value.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A system for monitoring and controlling the pH of a drilling fluid, the system comprising:
   a drilling fluid heater configured to heat the drilling fluid;
   a first sensor configured to sense a first pH-value and an associated first temperature of the drilling fluid prior to being heated by the drilling fluid heater;
   a second sensor configured to sense a second pH-value and an associated second temperature of the drilling fluid subsequent to being heated by the drilling fluid heater; and a controller comprising a memory having non-transitory computer readable instructions and a processing device for executing the computer readable instructions, the computer readable instructions comprising:
  receiving the first pH-value and first temperature from the first sensor;
  receiving the second pH-value and second temperature from the second sensor; and
  determining an amount of additive to add to the drilling fluid to maintain a desired pH-value at the second temperature.

2. The system of claim 1, wherein the second temperature is representative of an expected temperature downhole of a well.

3. The system of claim 2, the computer readable instructions further comprising:
  adjusting the drilling fluid heater based on the first temperature to heat the drilling fluid to the expected temperature downhole.

4. The system of claim 1, wherein the first sensor comprises a first pH sensor and a first temperature sensor, and wherein the second sensor comprises a second pH sensor and a second temperature sensor.

5. The system of claim 1, the computer readable instructions further comprising:
  enabling the determined amount of additive to be added to the drilling fluid by an additive system.

6. The system of claim 1, wherein the drilling fluid heater is a first drilling fluid heater, the system further comprising:
  a third sensor to sense a third pH-value and an associated third temperature of the drilling fluid prior to being heated by a second drilling fluid heater; and
  a fourth sensor to sense a fourth pH-value and an associated fourth temperature of the drilling fluid prior to being heated by the second drilling fluid heater.

7. The system of claim 6, further comprising:
  adjusting the second drilling fluid heater based on the third temperature to heat the drilling fluid to an expected temperature downhole in a well.

8. The system of claim 1, the computer readable instructions further comprising:
  adjusting the drilling fluid heater to heat the drilling fluid to an expected temperature downhole based on the first temperature; and
  comparing the second pH-value to a predefined range of pH-values,
  wherein the determining is based on the comparing the second pH-value to the predefined range of pH-values.

* * * * *